United States Patent [19]

Dedisse

[11] Patent Number: 5,509,820
[45] Date of Patent: Apr. 23, 1996

[54] INTEGRATED CIRCUIT KEY AND CONNECTOR NOTABLY FOR SUCH A KEY

[75] Inventor: Nicolas Dedisse, Marseille, France

[73] Assignee: Gemplus Card International, Gemenos, France

[21] Appl. No.: 278,460

[22] Filed: Jul. 21, 1994

[30] Foreign Application Priority Data

Jul. 22, 1993 [FR] France ................................ 93 09057

[51] Int. Cl.⁶ ................................................ H01R 13/15
[52] U.S. Cl. ............................................ 439/260; 439/635
[58] Field of Search .................................. 439/259, 260, 439/267, 325, 327, 328, 59, 62, 630, 635

[56] References Cited

U.S. PATENT DOCUMENTS 5,066,241 11/1991 Hills .......................................... 439/260
5,091,618 2/1992 Takahashi ........................... 439/260 X

FOREIGN PATENT DOCUMENTS 0295607 12/1988 European Pat. Off. .
0388997 9/1990 European Pat. Off. .
2654556 5/1991 France .

Primary Examiner—Khiem Nguyen
Attorney, Agent, or Firm—Nilles & Nilles

[57] ABSTRACT

The disclosure relates to "chip" type electronic keys and the connectors designed to work with these keys. A bolting or blocking groove is provided in the face of the key opposite the one supporting the chip, in an intermediate position between this chip and the front end of the key. The key-blocking means therefore press the key towards the connection means which are located above the key. Thus, clearance is eliminated and the clogging of the contacts is avoided. The disclosure enables the use of the known standard of chip keys for the chip and its connection means.

13 Claims, 1 Drawing Sheet

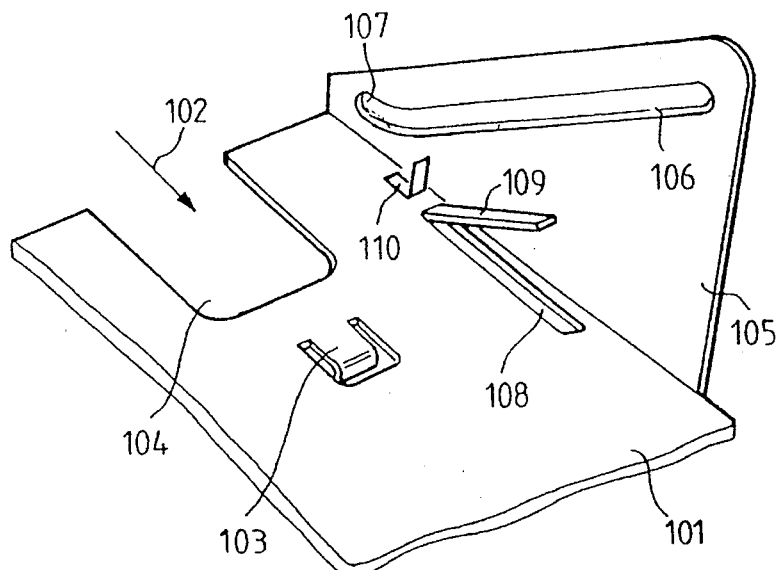
FIG_1
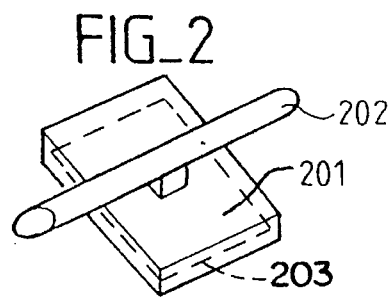
FIG_2
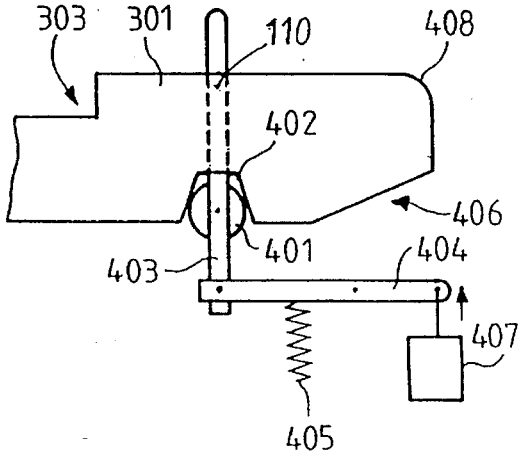
FIG_4
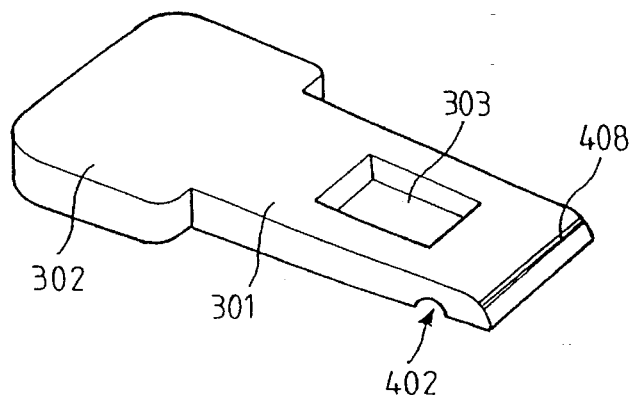
FIG_3
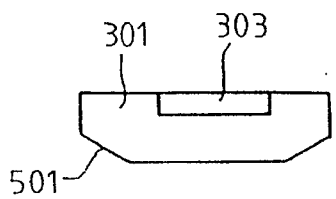
FIG_5

INTEGRATED CIRCUIT KEY AND CONNECTOR NOTABLY FOR SUCH A KEY

BACKGROUND OF THE INVENTION

The present invention relates to keys that incorporate an integrated circuit that can be used to replace the mechanical characteristics that usually constitute the originality and security of a key with electronic characteristics. It also relates to the connectors designed to receive an object such as a key of this type to set up the contacts with the electronic device forming, in this case, the main elements of the lock with which the key must be matched.

The advantages of keys having an integrated circuit are well known, especially with regard to discretion and easy neutralization if the key should be lost. The various embodiments known to date nevertheless have a number of drawbacks related essentially to the matching of the key with the connector that forms the lock, so as to obtain operation that is as reliable as in the case of purely mechanical keys.

SUMMARY OF THE INVENTION

To overcome these drawbacks, the invention proposes an electronic key of the type comprising an elongated part designed to be inserted into a connector matched with the key, an integrated circuit provided with connection means that are flush with one of the faces of the elongated part and a locking groove transversal to this elongated part, wherein chiefly this groove is located on the face opposite to the one with which the contacts of the integrated circuit are flush.

The invention also proposes a connector for an object provided with an integrated circuit, notably for an electronic key, of the type comprising a connection grid to get connected with connection means of the integrated circuit of the object, a mechanism to place the grid in contact with these connection means, bolting means designed to hold the object fixed in a determined way with respect to the connection grid, wherein chiefly the bolting means act in a direction opposite to the direction of operation of the contact-making mechanism.

BRIEF DESCRIPTION OF THE DRAWINGS

Other features and advantages of the invention shall appear clearly from the following description, made by way of a non-restrictive example, with reference to the appended drawings, of which:

FIG. 1 shows a partial view in cavalier projection of a guide of a connection device according to the invention;

FIG. 2 shows a cavalier projection of a connection grid support designed to slide in the guide of FIG. 1;

FIG. 3 shows a cavalier projection of a key according to the invention;

FIG. 4 shows a sectional side view of the end of this key and of a bolt designed to fixedly join the key and the guide; and FIG. 5 shows a sectional front view of the key of FIG. 3.

MORE DETAILED DESCRIPTION

An electronic key, in order to be used, is inserted like an ordinary key into the slot of a suitable lock comprising notably a special connector used to set up contacts with the connection points of the integrated circuit, generally called chips, inserted into the key. This connector includes several parts that can be made according to various methods, some of which are well known. There is notably a known way of using a guide into which the key is inserted, the withdrawal motion of the guide bringing into play various mechanisms which, in particular, set up contact with the chip of the key and the blocking of this key.

In order to make it easier to describe the invention, FIG. 1 shows solely the guide proposed in the invention in a way that is both simplified and partial so as to make it easier to examine the drawing.

This guide is formed by a plate 101 beneath which the key is inserted in its motion of being introduced into the lock, represented by the arrow 102. After sliding beneath the face of this plate, the front end of the key abuts a snug 103 that is made by punching into the middle of the plate. The relative motion of the key and the plate then stops and the key is positioned with respect to the plate in such a way that the contacts of the chip contained in the key are at the center of a substantially rectangular scallop 104 opened in the rear end of the plate so as to enable access to these contacts to set up the necessary connections. At this point in time, the key is only half engaged in the lock.

The penetrating motion of the key then continues and carries along the guide since it is fixed against the snug 103. The connector naturally includes elastic means, such as a spring, that enable the guide to be pushed back in the reverse direction to that of the motion 102 so as to firstly provide for the relative positioning of the key and of the guide and secondly push the guide back to its resting position when the key has been released.

The guide furthermore has two side flanges 105 fixed to the sides of the plate 101, perpendicularly to the plane of this plate and in parallel to the motion 102. These flanges have slots that are inclined from top to bottom and from the rear to the front of the guide (by convention, the front is the side by which the key is inserted). These slots end in a substantially horizontal portion 107.

These slots are used to maneuver a connection element shown in FIG. 2. This connection element has a support 201 with dimensions matching those of the scallop 104. The support is connected to the lower part of a horizontal bar 202. A contact grid 203 matching the connections of the chip of the key is fixed to the lower face of the support 201. A set of flexible connection wires, not shown in the figure, is used to connect this contact grid with the electronic elements of the lock which are known per se. The two ends of the bar 202 get engaged into the slots 106 of the flanges 105. They are joined to the fixed part (not shown) of the lock, in which the guide slides, so as to get shifted solely in the vertical direction. Thus, when the guide moves back under the effect of the key, the bar 202 will slide into the slots 106 and the inclination of these slots will cause the descent of the bar and of the support 201 that is connected to it towards the upper surface of the plate 101. At the end of this motion, the support 201 gets housed in the scallop 104 and the bar 202 gets fixed in the small horizontal part 107 of the slot 106 which fixes the support 201 with respect to the plate 101.

The key according to the invention, which is shown in FIG. 3, is made by the molding of a plastic material. There is only one shape for all the keys. This is one of the known advantages of electronic keys. This key has an elongated part 301 which generally has the shape of a rectangular parallelepiped but has its faces modified to fulfil different functions that shall be described here below. This elongated part plays the role of the bit in an ordinary mechanical key. It ends in a wider part 302 that serves as the handle of the key.

The key is shown in this figure in cavalier projection in its position of normal use, and the upper face of the figure corresponds to the face which, according to the invention, will be located horizontally and on top when the key is used.

On this upper face, there is made a substantially parallelepiped-shaped blind cavity 303 which will be used to house the integrated circuit containing the data elements that will be used to give the key its individual character and associate it with the lock that it will open. This integrated circuit is associated with a connection device, formed for example by an appropriately etched piece of printed circuit such as those used in so-called chip type bank cards. This connection system and its link with the chip are well known in this technique of chip cards. The unit is then placed in the cavity where it is sealed by means of a bonder adapted to this purpose, in the same way as in chip cards. The cavity itself is made so that the contacts are slightly withdrawn from the surface of the elongated part 301, in order to protect these contacts especially against friction with the lips of the aperture of the lock when the key is inserted into it.

The location and the dimensions of the cavity 303 are determined so that the contacts get placed just below the scallop 104 when the key is fixed with respect to the guide by the snug 103.

Thus, when the guide ends its motion, the contact grid fixed to the support 201 penetrates the upper end of the cavity 303 to set up the contacts with the connections of the chip located in this cavity.

The upward position of the opening of the cavity 303 and hence of the connection elements of the chip make it possible to prevent the connection grid located on the support 201 from getting clogged with various particles that would collect on itself if it were to be placed in the opposite direction with its contacts facing upwards.

In order to enable the key to be inserted systematically in the right direction, the cross-section of the part 301 will be given a particular shape shown in the cross-sectional view of FIG. 5. This shape makes it possible, inter alia, to prevent mistakes by preventing the insertion of the key into the aperture of the lock, this aperture having the same shape as this cross-section. For this purpose, the lower corners of the part 301 are folded back to obtain chamfers 501 having for example an angle of 35° to the horizontal, thus giving this cross-section a generally trapezoidal appearance. It can easily be imagined that if the aperture designed for the insertion of the key has the same shape, it will be possible to insert it in only one direction, with the cavity 303 upwards.

Furthermore, this device makes it possible to concentrate the essential part of the wearing out of the faces of the key, arising out of friction with the aperture of the key, on the lower face of this key. This makes it possible, in the course of time, to maintain suitable tolerance values for the positioning of the upper face with respect to the contact grid.

Furthermore, according to a generally chosen arrangement, there is provision for means to fixedly hold the key or keep it blocked in the lock throughout the time when information is being exchanged between the chip of the key and the electronic system of the lock so that this operation can be conducted with total security, especially in order to provide electrical protection to both the chip and the elements of the lock.

These bolting or blocking means are shown schematically in FIG. 4 along with a longitudinal section of the front end of the part 301 of the key.

These means have a roller 401 that gets engaged into a transversal groove 402 made in the lower face of the part 301 and, hence, on the face opposite the one bearing the chip. This roller is preferably a horizontal roller born by a set of hinged arms 403 and 404 pushed upwards by a spring 405. According to a first variant, when the key is pushed in, its end abuts the roller 401 which descends and then rolls on the lower face of the key and then rises to get engaged in the groove 402. This action occurs at the end of the motion of the key and bolts this key into the lock. In order to make it easier for the roller to descend when the end of the key abuts it, the lower face of this key is bevelled in order to form a clearance giving an inclined edge 406 forming for example an angle of 35° with the horizontal.

According to a preferred variant, the vertical arm 403 has the shape of a two-pronged fork that gets engaged into lateral slots 108 made in the plate 101 by the punching of strips 109 curved upwards in an acute angle. These strips force the fork 403 to plunge in, carrying along the roller which therefore no longer abuts the inclined edge 406. At the limit of their travel, the prongs of the fork meet the apertures 110 made behind the slots 108. They penetrate these apertures enabling the roller 401 to rise and get engaged into the groove 402. Thus, the wearing out of the key and of the lock are diminished, making it possible for example to simplify the manufacture of the lock by replacing the roller with a horizontally elongated flat part of the bar 403.

Under the effect of the spring 405, the roller 401 therefore leans on the walls of the groove 402 and places the key flat against the lower face of the plate 101 of the guide. This holds the two parts with respect to each other in a well-defined relative position and makes it possible to compensate for inevitable clearance. It is thus possible to obtain far greater precision at the contact gate supported by the plate 201 and hence to tolerate greater initial clearance values than if the lock were to be positioned on the top of the key, on the chip side.

Furthermore, the invention also proposes the placing of the groove 402 before the cavity 303 between this cavity and the front end of the key but, naturally, always on the face opposite the one containing this cavity. It is thus possible to use a spring 405 that is firm enough to hold the key very efficiently in the lock without any risk of deforming the key at the chip and of damaging it.

When the exchanges of information between the chip and the electronic circuits of the lock are over, these circuits activate the interruption of the electrical connection. In particular, the supply voltage for the chip disappears and, to release the key, these very same electronic elements activate a motor 407, an electromagnet for example, that causes the rocking of the lever 404. This causes the roller 401 to come down again and enables the ejection of the key under the effect of the elastic means that push the guide backwards.

For the sake of security, should this action fail, for example because of a malfunctioning of the electromagnet 407, it is furthermore provided, according to the invention, that the groove 402 will have a substantially trapezoidal section with flanks that are slightly inclined, by 16° for example, towards the interior of the groove. In this way, it is always possible by pulling very hard on the key, to drag the roller 401 over that face of the groove 402 which is most inclined frontwards, thus forcing this roller to come downwards and enabling the key to be released mechanically. Naturally, the strength of the spring 405 shall be designed so that there is no risk of this action's causing the key to break.

Finally, it is also provided according to the invention that the upper edge 408 of the end of the key will be rounded, with a radius of 0.5 mm for example, so that it can be matched with the end of the snug 103. Indeed, the plate 101 as well as many other elements of the guide and the lock are preferably made by punching in order to reduce costs. Thus, the end of the snug 103, which is folded downwards, necessarily has a rounded portion on the inside with a radius that is relatively great while at the same time being defined with fairly low precision. If, therefore, the edge that this abutting at this position were to be sharp, the point of contact between the key and the end of the snug would be defined in a relatively imprecise way. This could give rise to poor contacts at the connection grid with the chip of the key. If this edge is sufficiently rounded, it no longer rests on the corner of the folded end of the snug and it is the flat part of this folded end that receives the flat part of the end of the key. This considerably reduces the tolerance values of positioning between the key and the snug and therefore between the key and the guide.

What is claimed is:

1. A connector for an electronic key provided with an integrated circuit, with flush contacts, designed to enable the exchange of information with a machine, the connector having a guide for the insertion of a key, a mechanism comprising a connection means in the form of a connection grid to ensure the connection with the integrated circuit and bolting means, wherein:

the guide has a plate flamed by two flanges, the plate being provided with a scallop before which there is placed a snug against which the key abuts when it is slid under the plate, the contacts of the key being in the scallop, the mechanism comprising the connection grid is capable of getting positioned above the contacts in the scallop, and wherein the bolting means has a roller supported by a hinged arm placed below the plate, the roller being designed to get housed in a groove made beneath the key so as to block any movement of the key in the connector during the exchange of information.

2. A connector according to claim 1, wherein the hinged arm is actuated by an electrical motor controlled by the electronic circuitry of the machine.

3. A connector according to claim 1, wherein the bolting means furthermore include elastic spring means to push back the roller bolt into its bolting position.

4. A connector according to claim 3, wherein the spring is calibrated to enable the retraction of the roller under the effect solely of the mechanical traction of the key.

5. A connector according to claim 1, wherein the guide is movable and is designed to shift under the pressure of the key, wherein it comprises a retractable plate bearing the connection grid and linking means between the guide and the retractable plate to cause the retractable plate to move towards a final position of a connection means of the integrated circuit of the key when the guide gets fixed at the end of its path.

6. A connector according to claim 5, wherein the retractable plate is maneuvered by means of a bar, the two ends of which are engaged in inclined slots made in the flanges.

7. A connector for connecting to an electronic key, the electronic key having an integrated circuit with flush contacts, the connector comprising:

a connection element comprising a contact grid, the contact grid having contacts which substantially match the contacts of the integrated circuit, the connection element being vertically movable within the connector and relative to the key, the connection element being movable to a position in which the contacts of the connection element are electrically connected to the contacts of the integrated circuit;

an electronic key guide, the electronic key guide further including a plate, the plate being disposed between the key and the connection element, the plate having a scallop formed therein, the scallop permitting the contacts of the connection element to make electrical contact with the contacts of the integrated circuit, and the plate having a snug, the snug being disposed between the scallop and a forwardmost end of the plate, the snug being disposed against the key when the key is inserted into the connector, first and second flanges, the first flange being disposed on one side of the plate and the second flange being disposed on the other side of the plate, a bolting device, the bolting device including a roller, the roller being supported by a hinged arm placed below the plate, the roller being adapted for reception in a groove formed in the key so as to restrict movement of the key in the connector during an exchange of information.

8. A connector according to claim 7, wherein the hinged arm is actuated by an electrical motor controlled by electronic circuitry.

9. A connector according to claim 7, wherein the bolting device further includes an elastic spring means to push back the roller into its bolting position.

10. A connector according to claim 9, wherein the spring is calibrated to enable the retraction of the roller under the effect of solely the mechanical traction of the key.

11. A connector according to claim 7, wherein the guide is movable and is designed to shift under the pressure of the key, wherein the guide comprises a retractable plate attached to the contact grid and linking means between the guide and the retractable plate to cause the retractable plate to move towards a final position of the contacts of the integrated circuit of the key when the guide gets fixed at the end of its path.

12. A connector according to claim 11, wherein the retractable plate is maneuvered by means of a bar, the two ends of which are engaged in inclined slots made in the flanges.

13. A connector for connecting to an electronic key, the electronic key having an integrated circuit with flush contacts, the connector comprising:

a connection element comprising a contact grid, the contact grid having contacts which substantially match the contacts of the integrated circuit, the connection element being vertically movable within the connector, and the connection element being movable to a position in which the contacts of the connection element are electrically connected to the contacts of the integrated circuit;

an electronic key guide, the electronic key guide being movable and being designed to shift under the pressure of the key, the guide further including a plate, the plate being disposed between the key and the connection element, the plate having a scallop formed therein, the scallop permitting the contacts of the connection element to make electrical contact with the contacts of the integrated circuit, and the plate having a snug, the snug being disposed between the scallop and a forwardmost end of the plate, the snug being disposed against the key when the key is inserted into the connector, first and second flanges, the first flange being disposed on one side of the plate and the second flange being disposed on the other side of the plate, a retractable plate attached to the contact grid and linking means between the guide and the retractable plate to cause the retractable plate to move towards a final position of the contacts of the integrated circuit of the key when the guide gets fixed at the end of its path, and the retractable plate being maneuvered by means of a bar, the two ends of the bar being engaged in inclined slots made in the first and second flanges;

a bolting device, the bolting device including a roller, the roller being supported by a hinged arm placed below the plate, the roller being adapted for reception in a groove formed in the key so as to restrict movement of the key in the connector during an exchange of information, and the hinged arm being actuated by an electrical motor controlled by electronic circuitry.

* * * * *